United States Patent
Orders

(10) Patent No.: US 10,589,865 B2
(45) Date of Patent: Mar. 17, 2020

(54) GUIDE-WEB

(71) Applicant: AMI Industries, Inc, Colorado Springs, CO (US)

(72) Inventor: Garrett Orders, Colorado Springs, CO (US)

(73) Assignee: AMI Industries, Inc, Colorado Springs, CO (US)

(*) Notice: Subject to any disclaimer, the term of this patent is extended or adjusted under 35 U.S.C. 154(b) by 145 days.

(21) Appl. No.: 15/898,472

(22) Filed: Feb. 17, 2018

(65) Prior Publication Data

US 2019/0256212 A1  Aug. 22, 2019

(51) Int. Cl.
  *B64D 11/06* (2006.01)
  *B60R 22/18* (2006.01)

(52) U.S. Cl.
  CPC .......... *B64D 11/0691* (2014.12); *B60R 22/18* (2013.01); *B64D 11/062* (2014.12); *B60R 2022/1818* (2013.01); *B60R 2022/1831* (2013.01)

(58) Field of Classification Search
  CPC ..... B60R 22/18; B60R 22/26; B60R 22/1952; B60R 2022/1831; B64D 11/062
  See application file for complete search history.

(56) References Cited

U.S. PATENT DOCUMENTS

| | | | |
|---|---|---|---|
| 5,716,073 A | 2/1998 | Redman | |
| 7,510,245 B2* | 3/2009 | Okazaki | B60R 22/26 297/182 |
| 7,566,075 B2* | 7/2009 | Latour | B60R 22/18 280/808 |
| 7,635,167 B2* | 12/2009 | Okazaki | B60N 2/688 280/808 |
| 9,254,767 B1* | 2/2016 | Tuman, II | B60N 2/809 |

FOREIGN PATENT DOCUMENTS

| | | |
|---|---|---|
| FR | 2861033 | 4/2005 |
| FR | 3022873 | 1/2016 |
| WO | 2015070970 | 5/2015 |

OTHER PUBLICATIONS

European Patent Office, European Search Report dated Jun. 19, 2019 in Application No. 19156425.1.

* cited by examiner

*Primary Examiner* — Faye M Fleming
(74) *Attorney, Agent, or Firm* — Snell & Wilmer, L.L.P.

(57) ABSTRACT

Apparatuses comprising a guide plate for safety restraint webbing is described herein. Also, systems comprising a guide plate and shroud for safety belts or restraint webbing are described herein.

9 Claims, 3 Drawing Sheets

Section
A-A

GUIDE-WEB

FIELD

This disclosure relates to safety restraints systems, and more particularly to guiding mechanisms for the restraint webbing, such as those found on a flight attendant seat in an aircraft.

BACKGROUND

Safety restraint systems for seats generally comprise a webbing or belt. This webbing may pass through one or more guiding mechanisms, which are used to properly orient the webbing. When the restraint system is in use, the webbing is retracted or extended through these guiding mechanisms. The webbing contacts the guiding mechanisms, resulting in the potential for wear with repeated use. The wear may be exacerbated when the webbing binds against the guiding mechanisms.

SUMMARY

Described herein are various embodiments of an apparatus. The apparatus may comprise a webbing guide plate. In various embodiments the webbing guide plate may have an outer face opposite an inner face, a top lateral face, a bottom lateral face, and a first aperture. In various embodiments the first aperture may comprise a first arc, displayed across the outer and inner face of the plate. The first aperture may extend from the outer face, through the plate, to the inner face. The first aperture may further comprise a second portion which may extend from the first portion, to the bottom lateral face of the plate.

In various embodiments the first portion of the first aperture may have outward rounded ends. The first arc may extend across the outer diameter of the face of the plate. In various embodiments the second section of the second aperture extends from an outer midpoint of the arc of the first section of the second aperture.

In various embodiments, the plate may further comprise a second raised lip on the outer face of the plate. The second lip may trace or outline the first section of the second aperture on the outer face of the plate.

In various embodiments, the first portion of the first aperture may be larger on the inner face of the plate than on the on the outer face of the plate. The first portion of the aperture may further comprise a lateral aperture surface. The lateral aperture surface may extend from the inner face of the plate to the outer face of the plate. The lateral aperture surface may be beveled.

In various embodiments, the guide plate may be curved so that the inner face is convex.

Also disclosed herein are various embodiments if a system. The system may comprise a webbing guide plate and a shroud. In various embodiments, the guide plate may comprise an outer face opposite an inner face, a top lateral face, and a bottom lateral face. In various embodiments the guide plate may also comprise a first aperture comprising a first arc, which may be displayed across the outer and inner face of the plate. The aperture may extend from the outer face, through the plate, to the inner face. In various embodiments the guide plate may further comprise a second aperture comprising a second arc, which may be displayed across the outer and inner face of the plate. The second aperture may extend from the outer face, through the plate, to the inner face. The system may further comprise a shroud comprising an inner surface and an outer surface, wherein the inner surface of the shroud may contact the outer face of the webbing guide plate.

In various embodiments, the first aperture of the guide plate may further comprise a second portion, which may extend from the first portion to the bottom lateral face of the plate. The first aperture may also comprise two ends that are rounded outward from the midpoint of the first portion of the first aperture.

The plate may further comprise a first raised lip on the outer face, which may trace the outline of the first portion of the first aperture on the outer face of the plat. In various embodiments the plate may also comprise a second raised lip on the outer face which may trace the outline of the first section of the second aperture on the outer face.

In various embodiments the shroud may comprise a first aperture disposed above the first portion of the first aperture of the guide plate, and a second aperture disposed above the first section of the second aperture of the guide plate. The first aperture of the shroud may pass entirely through the shroud from the inner surface to the outer surface. The second aperture may pass entirely through the shroud from the inner surface to the outer surface. The first raised lip of the guide plate may extend through the first aperture of the shroud. The second lip of the guide plate may extend through the second aperture of the shroud. In various embodiments the lateral aperture surface of the first part of the first aperture of the plate may be beveled. In various embodiments the lateral aperture surface of the first section of the second aperture of the plate may be beveled.

Also found herein are various embodiments of a safety restraint system. In various embodiments the safety restraint system may comprise a webbing guide plate, which may comprise an outer face opposite an inner face, a bottom lateral face, and a top lateral face. The webbing guide plate may further comprise a first webbing guide plate aperture comprising a first arc, displayed across the outer face and the inner face of the webbing guide plate, wherein the first aperture extends from the outer face, through the webbing guide plate, to the inner face; and a second webbing guide plate aperture comprising a second arc, displayed across the outer face and the inner face of the webbing guide plate, wherein the second aperture extends from the outer face, through the webbing guide plate, to the inner face.

In various embodiments the safety restraint system may further comprise a shroud comprising an inner surface and an outer surface, wherein the inner surface of the shroud contacts the outer face of the webbing guide plate, a first shroud aperture, and a second shroud aperture. In various embodiments the safety restraint system may further comprise a restraint webbing that contacts the webbing guide plate.

In various embodiments the restraint webbing may further comprise a first strap that extends through the first shroud aperture and the first webbing guide plate aperture, and a second strap that extends through the second shroud aperture and the second webbing guide plate aperture.

BRIEF DESCRIPTION OF THE DRAWINGS

The present disclosure may be better understood with reference to the following drawing figures and description. Non-exhaustive and non-limiting descriptions may refer to the following drawings. The components in the figures are not necessarily to scale as the illustrated principles are

DETAILED DESCRIPTION

The detailed description of various embodiments herein refer to the aforementioned drawing figures. These figures and drawings show various embodiments and implementations of the description for purposes of illustration and its best mode, not of limitation. It should be understood that while these embodiments are described in sufficient detail to enable those skilled in the art to practice the embodiments, other embodiments may be realized and that logical and mechanical changes may be made without departing from the spirit and scope of the disclosure. Any reference to singular includes plural embodiments. Any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of a seat, and more specifically a seat within an aircraft, it should be understood that systems and methods disclosed herein may be incorporated into any restraint mechanism, particularly those with a webbing, strap, or belt that may be extended or retracted.

Seat restraints, particularly seat restraints in an airplane, may comprise a four-point or five-point safety restraint or safety harness system. In these systems, a webbing strap extends over each shoulder of the user. These shoulder straps or webbing may retract and extend from the seatback.

Figure 1:
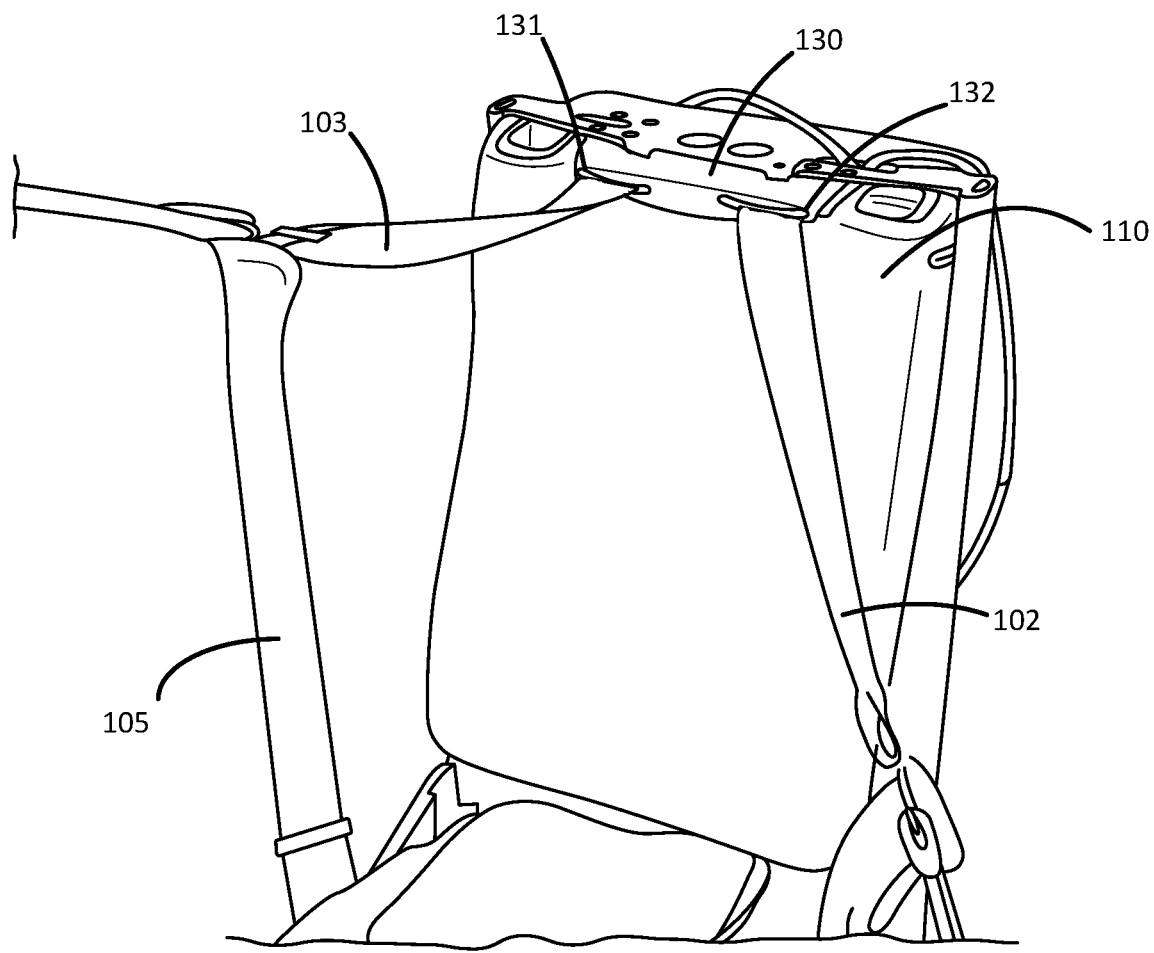
FIG. 1 illustrates a portion of the restraint webbing guide system as used on a seat, in accordance with various embodiments.

Disclosed herein are various embodiments of a system for webbing guides. With reference to FIG. 1, this system may include a guide plate disposed within the seatback 110, behind the shroud 130. The restraint webbing 105 may comprise a number of straps or belts. A first belt 103 may extend into the seat through a first shroud aperture 131. A second belt 102 may extend through a second shroud aperture 132.

Figure 2A:
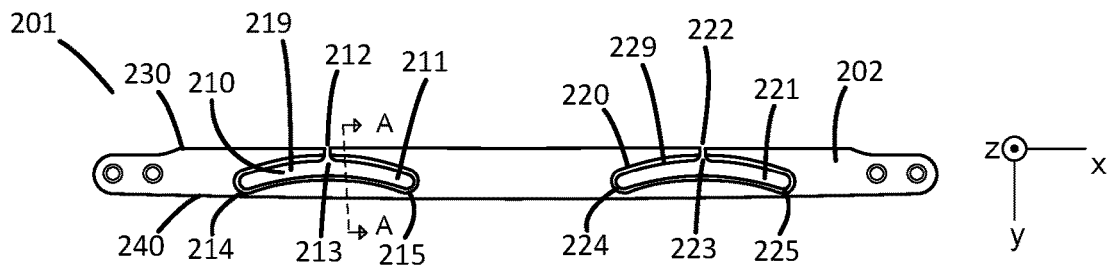
FIG. 2A illustrates a view of the outer face of a guide plate, in accordance with various embodiments.

Also described herein are various embodiments of an apparatus. This apparatus may comprise a webbing guide plate 201, which may be referred to herein as a guide plate or plate. With reference to FIG. 2A the guide plate 201 may have a first aperture 210 and a second aperture 220 disposed across an outer face 202 of the guide plate 201. The first aperture 210 may comprise a first portion 211 and a second 212 portion, and the second aperture 220 may comprise a first section 221 and a second section 222. A first belt 103 of the webbing 105 of a restraint system may be disposed within the first portion 211 of the first aperture 210, and a second belt of the webbing may be disposed within the first section 221 of the second aperture 220.

The first portion 211 of the first aperture 210 may comprise a first arc 219. The first arc 219 may be disposed across the outer face such that the first arc 219 extends laterally across the outer face 202. The midpoint 213 of the first arc 219 may be the closest point of the first arc 219 to the top lateral side 230 of the plate. The endpoints, 214 and 215, of the first arc 219 may be closer to the top lateral face 240 of the plate than the bottom lateral face 230. The radius of the first arc 219 may have a first arc 219 radius of between about 1 inch and about 6 inches (2.54-15.24 centimeters), between about 1.5 inches and about 5 inches (3.81-12.7 centimeters), and between about 2 inches and about 4 inches (5.08-10.16 centimeters), wherein the term "about" in this context only means+/−0.5 inches (+/−1.27 centimeters). Additionally, the first section 221 of the second aperture 220 form a second arc 229. The second arc 229 may be displayed across the outer face such that the second arc 229 extends in the x direction across the outer face 202. The midpoint 223 of the second arc 229 may be the closest point of the second arc 229 to the top lateral side 230 of the plate. The endpoints, 224 and 225, of the second arc 229 may be closer to the top lateral face 240 of the plate than the bottom lateral face 230.

The end points 214 and 215 of the first portion of the first aperture 210 and the end points 224 and 225 of the first section of the second aperture 224 and 225 may be outwardly rounded. This tends to prevent the webbing from catching or binding within a corner. Rather, the webbing may partially fold back over itself.

The guide plate 201 may be flat, or curved so that the outer face 202 is concave, and the inner face 203 is convex. This curvature may be to accommodate the back of the seat.

Figure 2B:
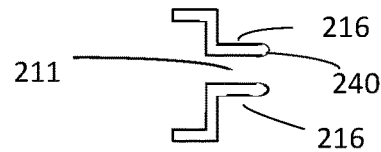
FIG. 2B illustrates a sectional view along the line A-A in FIG. 2A.
Figure 2C:
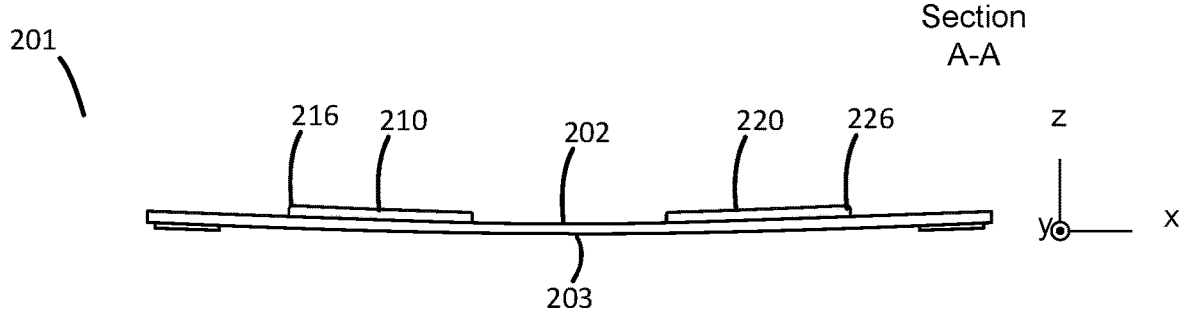
FIG. 2C illustrates a view of the top lateral face of the guide plate, in accordance with various embodiments.

FIG. 2B illustrates a cross sectional view off FIG. 2A along the A-A line. With additional reference to FIG. 2C, the first aperture 210 may additionally comprise a first lip 216 that surrounds the first portion 211 of the first aperture 210 and extends in the z direction from the outer face 202. The second aperture 220 also may additionally comprise a second lip 226 that surrounds the first section 221 of the second aperture 220 and extends in the z direction from the outer face 202. The edges 240 of the lip 216 and/or 226 may be curved, rounded or radiused, creating a smooth surface. In various embodiments, the lips 216 and 226 and the plate 201 are a single piece. The lips 216 and 226 may be a bead on the outer face. In various embodiments, the lips 216 and 226 may extend from the surface of the inner face by between about 0.1 inches to about 0.3 inches (0.254-0.762 centimeters), +/−0.1 inches (0.254 centimeters).

Figure 2D:
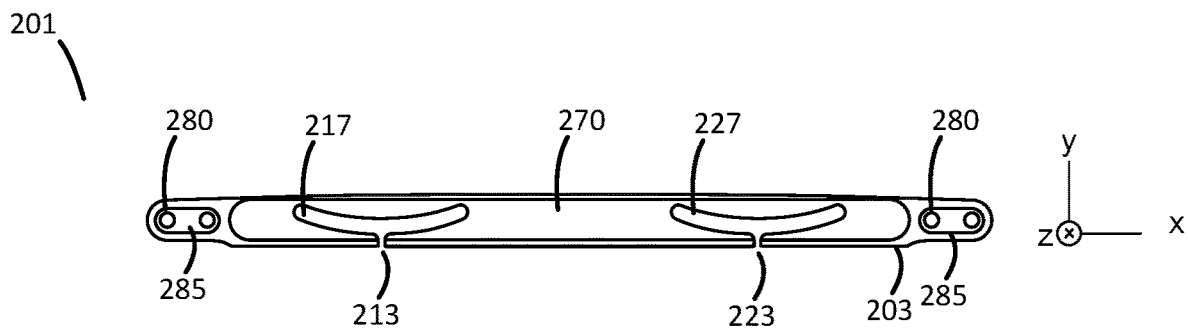
FIG. 2D illustrates a view of the inner face of the guide plate, in accordance with various embodiments.

With additional reference to FIG. 2D, the first aperture 210 and second aperture 220 extend entirely through the guide plate 201 from the outer face 202 to the inner face 203. The surface area of the first portion 211 of the first aperture 210 and the surface area of the first section 221 of the second aperture 220 on the outer face 202 may be smaller than their respective surface areas on the inner face 203. The result is that the inner lateral surface 217 of the first section 211 of the first aperture 210 and the inner lateral surface 227 of the first section 221 of the second aperture 220 are beveled. The inner face of the plate may further comprise a recess 270 that extends partially through the plate. The recess may surround the first portion 211 of the first aperture 210 and the first section 221 of the second aperture 220.

The guide plate 201 [202 is outer face] may also comprise one or more connector apertures 280. These apertures may be used to install the guide plate 201 [202 is outer face] in the seatback. The inner face 203 of the guide plate 201 may also comprise one or more bosses 285 that surround one or more connector apertures 280.

Figure 2E:
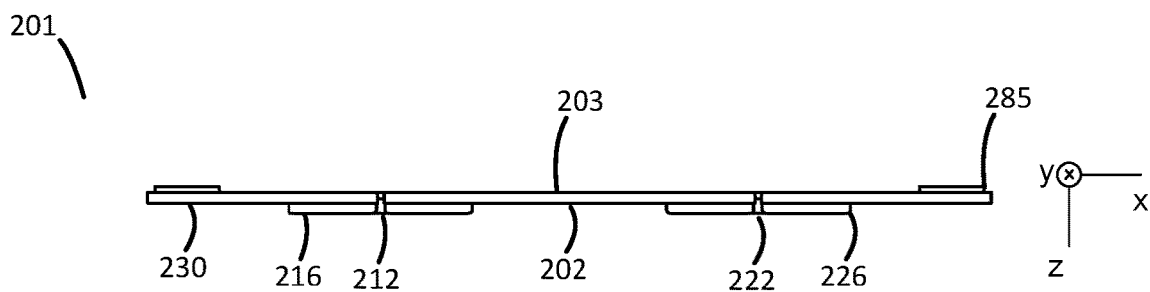
FIG. 2E illustrates a view of the bottom lateral face of the guide plate, in accordance with various embodiments.

With additional reference to FIG. 2E, the first aperture 210 and second aperture 220 may each comprise a second portion 212 and second section 222, respectively. The second portion 212 may extend from the midpoint of the first portion 213 and the second section 222 may extend from the first section 223 to the bottom lateral face 230 of the guide plate. The second portion 212 and the second section 222 may be used to remove or replace the webbing. The second portion 212 and the second section 222 may extend parallel to one another from the first portion and the first section, respectively.

Figure 3:
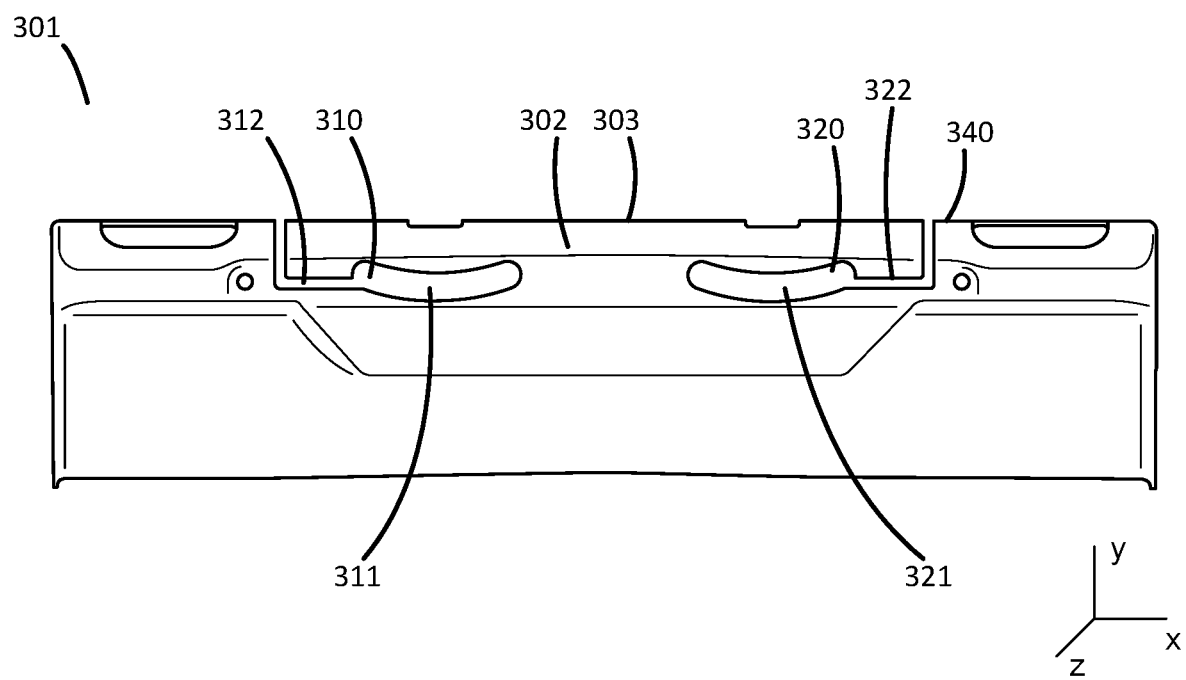
FIG. 3 illustrates a view of the outer surface of a shroud, in accordance with various embodiments.

With reference to FIG. 3, the shroud 301 may have an inner surface 303 and an outer surface 302. The outer surface 302 may face away from the seatback. The inner surface 303 contacts the outer face of the guide plate. The shroud may also be decorative, and it may comprise a different material than the guide plate. The shroud may be formed from any suitable material, such as plastic.

The shroud 301 will have shroud apertures 310 and 320 which correspond to the apertures of the guide plate that the webbing extends through. The shroud may comprise a first shroud aperture 310, and a second shroud aperture 320. Both apertures may extend entirely through the shroud from the inner surface 303 to the outer surface 302. The first shroud aperture 310 may have a first portion 311 and a second portion 312. The first portion 311 of the first shroud aperture 310 may have the same shape as the first portion of the first aperture in the guide plate. The first shroud aperture 310 of the shroud 301 is also aligned with the first aperture of the guide plate. The lip surrounding the first portion of the first aperture in the wear plate extends through the first portion 311 of the first shroud aperture 310 so that the webbing will tend not to come into contact with the aperture 310 of the shroud 301 in response to the webbing being extended and retracted.

Similarly, the second shroud aperture 320 will have a first section 321 and second section 322. The first section 321 of the second shroud aperture 320 has a similar shape to the first section of the second guide plate aperture. The second shroud aperture 320 is also aligned with the second aperture of the guide plate so that the lip that surrounds the first section of the second guide plate aperture can extend from the guide plate, and through the first section 321 of the second shroud aperture 320. The lip of the first section of the second guide plate aperture will also prevent the webbing from contacting the second shroud aperture 320 when the webbing is extended or allowed to retract through the aperture.

With the curvature of the guide plate apertures, the webbing is encouraged to roll over itself rather than bind against the side of the plate, and the lip tends to protect the webbing from the edges of the shroud apertures.

The first shroud aperture 310 may further comprise a second portion 312 that extends from the first portion 311 of the first aperture 310 out to an edge 340 of the shroud 301. The second shroud aperture 320 may further comprise a second section 322 that extends from the first section 321 of the second aperture 320 to an edge 340 of the shroud 301. The second portions 312 and second section 322 each may be used to insert or remove the webbing from the shroud. The second portion 312 of the first shroud aperture 310 and the second section 322 of the second shroud aperture 320 may be nonadjacent to, or diverge from, the second portions of the first plate aperture and the second plate aperture. In this way the webbing must be manipulated in different directions to install it within the guide plate and within the shroud.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus comprising
a webbing guide plate with an outer face opposite an inner face, and
a first aperture having a first portion comprising a first arc that extends through the webbing guide plate from the outer face to the inner face,
wherein the webbing guide plate comprises a second aperture extending from the outer face, through the webbing guide plate, to the inner face, wherein the second aperture comprises a first section with outward rounded ends as viewed from the outer side,
wherein the second aperture further comprises a second section which extends from the first section to a bottom lateral face of the webbing guide plate,
wherein the first aperture further comprises a second portion which extends from the first portion to the bottom lateral face of the webbing guide plate, parallel to the second section of the second aperture,
wherein the first section of the second aperture comprises an arc, extending across the outer face and the inner face of the webbing guide plate, wherein the second section of the second aperture extends from an outer midpoint of the arc of the first section of the second aperture, wherein the webbing guide plate further comprises a second lip on the outer face which traces an outline of the first section of the second aperture on the outer face, wherein an edge of the second lip is rounded, and wherein the first portion of the first aperture has a greater surface area on the inner face than on the outer face and the first section of the second aperture has a greater surface area on the inner face than on the outer face.

2. The apparatus of claim 1, wherein the first portion of the first aperture comprises a lateral aperture surface extending from the inner face through the webbing guide plate which is beveled.

3. A system comprising
a webbing guide plate, comprising
an outer face opposite an inner face,
a bottom lateral face,
a top lateral face,
a first aperture having a first portion comprising a first arc that extends through the webbing guide plate from the outer face to the inner face, and
a second aperture having a first section comprising a second arc that extends through the webbing guide plate from the outer face to the inner face; and
a shroud comprising an inner surface and an outer surface, wherein the inner surface of the shroud contacts the outer face of the webbing guide plate.

4. The system of claim 3, wherein the first aperture further comprises a second portion which extends from the first arc, to the bottom lateral face of the webbing guide plate.

5. The system of claim 4, wherein the first portion of the first aperture comprises the first arc and two ends that are rounded outward from a midpoint of the first portion of the first aperture.

6. The system of claim 5, wherein the webbing guide plate further comprises a first raised lip having a rounded edge on the outer face which traces an outline of the first portion of the first aperture on the outer face, and a second raised lip on the outer face which traces the outline of the first section of the second aperture on the outer face.

7. The system of claim 6, wherein the shroud comprises a first shroud aperture that passes through the shroud from the inner surface to the outer surface, disposed above the first portion of the first aperture of the webbing guide plate, and
a second shroud aperture that passes through the shroud from the inner surface to the outer surface, disposed above the first section of the second aperture of the webbing guide plate, wherein the first raised lip of the webbing guide plate extends through the first shroud aperture, and a second lip of the webbing guide plate extends through the second shroud aperture.

8. A safety restraint system comprising:
a webbing guide plate, comprising:
an outer face opposite an inner face,
a first webbing guide plate aperture comprising a first arc, displayed across the outer face and the inner face of the webbing guide plate, wherein a first aperture extends from the outer face, through the webbing guide plate, to the inner face, and
a second webbing guide plate aperture comprising a second arc, displayed across the outer face and the inner face of the webbing guide plate, wherein a second aperture extends from the outer face, through the webbing guide plate, to the inner face;
a shroud comprising an inner surface and an outer surface, wherein the inner surface of the shroud contacts the outer face of the webbing guide plate, a first shroud aperture, and a second shroud aperture; and
a restraint webbing that contacts the webbing guide plate.

9. The safety restraint system of claim 8, wherein the restraint webbing further comprises a first strap that extends through the first shroud aperture and the first webbing guide plate aperture, and a second strap that extends through the second shroud aperture and the second webbing guide plate aperture.

* * * * *